(12) United States Patent
Ishihara et al.

(10) Patent No.: US 7,484,340 B2
(45) Date of Patent: Feb. 3, 2009

(54) DISPLAYING OPTICAL SYSTEM AND IMAGE PROJECTION APPARATUS

(75) Inventors: Keiichiro Ishihara, Yokohama (JP);
Ryuichi Sakaguchi, Machida (JP);
Shuichi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 11/192,872

(22) Filed: Jul. 28, 2005

(65) Prior Publication Data
US 2006/0023165 A1 Feb. 2, 2006

(30) Foreign Application Priority Data
Jul. 30, 2004 (JP) ............... 2004-224781

(51) Int. Cl.
*G03B 21/14* (2006.01)
(52) U.S. Cl. .......................... 53/20; 359/486
(58) Field of Classification Search ............... 353/8, 353/20; 359/485, 486, 464, 489, 196–226; 349/80, 96
See application file for complete search history.

(56) References Cited

U.S. PATENT DOCUMENTS

| 5,357,370 | A | | 10/1994 | Miyatake et al. | |
|---|---|---|---|---|---|
| 5,513,035 | A | | 4/1996 | Miyatake et al. | |
| 5,686,975 | A | * | 11/1997 | Lipton | 349/15 |
| 5,694,164 | A | * | 12/1997 | Choi | 348/57 |
| 5,712,694 | A | | 1/1998 | Taira et al. | |
| 5,886,816 | A | * | 3/1999 | Faris | 359/464 |
| 5,991,074 | A | * | 11/1999 | Nose et al. | 359/465 |
| 6,109,750 | A | * | 8/2000 | Mayer et al. | 353/7 |
| 6,222,672 | B1 | * | 4/2001 | Towler et al. | 359/465 |
| 6,368,760 | B1 | * | 4/2002 | Nishiguchi | 430/20 |
| 6,542,296 | B2 | * | 4/2003 | Lee et al. | 359/462 |
| 6,798,575 | B2 | * | 9/2004 | Kobayashi | 359/618 |
| 6,897,992 | B2 | | 5/2005 | Kikuchi | |
| 6,927,915 | B2 | | 8/2005 | Nakai | |
| 6,945,652 | B2 | | 9/2005 | Sakata et al. | |
| 6,967,671 | B2 | | 11/2005 | Miyagawa | |
| 7,048,396 | B2 | * | 5/2006 | Schmidt et al. | 362/19 |
| 7,286,154 | B2 | | 10/2007 | Miyagawa | |
| 2003/0007068 | A1 | | 1/2003 | Miyagawa | |
| 2003/0107805 | A1 | * | 6/2003 | Street | 359/464 |

(Continued)

FOREIGN PATENT DOCUMENTS

EP 1275987 1/2003

(Continued)

OTHER PUBLICATIONS

English Abstract for Japanese Application No. 06-208089.

(Continued)

*Primary Examiner*—William C. Dowling
(74) *Attorney, Agent, or Firm*—Morgan & Finnegan, LLP

(57) ABSTRACT

A compact displaying optical system capable of reducing a speckle noise and a loss of light amount is disclosed. The displaying optical system comprises a light source which emits coherent light, and a polarization control element which has a first area and a second area where light components of the light enter, respectively. The polarization control element makes the polarization state of the light component entering the first area different from that of the light component entering the second area.

17 Claims, 7 Drawing Sheets

U.S. PATENT DOCUMENTS

| | | |
|---|---|---|
| 2003/0231395 A1 | 12/2003 | Nakai |
| 2004/0109219 A1 | 6/2004 | Kikuchi |
| 2005/0280697 A1 | 12/2005 | Miyagawa |
| 2006/0023164 A1* | 2/2006 | Sakaguchi et al. ............ 353/20 |

FOREIGN PATENT DOCUMENTS

| | | |
|---|---|---|
| JP | 05-157915 | 6/1993 |
| JP | 06-208089 | 7/1994 |
| JP | 06-244082 | 9/1994 |
| JP | 08-087011 | 4/1996 |
| JP | 10-039267 | 2/1998 |
| JP | 10-124915 | 5/1998 |
| JP | 2000-206449 | 7/2000 |
| JP | 2000-347138 | 12/2000 |
| JP | 2002-062582 | 2/2002 |
| JP | 2003-015087 | 1/2003 |
| JP | 2003-021800 | 1/2003 |
| JP | 2003-121791 | 4/2003 |
| JP | 2004-020957 | 1/2004 |
| JP | 2004-151133 | 5/2004 |
| JP | 2004-170508 | 6/2004 |

OTHER PUBLICATIONS

English Abstract for Japanese Application No. 10-039267.
English Abstract for Japanese Application No. 2000-206449.
English Abstract for Japanese Application No. 2003-021800.
English Translation Abstract of Japanese Patent Publication 2004-151133.
English Translation Abstract of Japanese Patent Publication 2004-020957.
English Translation Abstract of Japanese Patent Publication 2003-015087.
English Translation Abstract of Japanese Patent Publication 08-087011.
English Translation Abstract of Japanese Patent Publication 05-157915.
English Translation Abstract of Japanese Patent Publication 2003-021800.
English Translation Abstract of Japanese Patent Publication 2002-062582.
English Translation Abstract of Japanese Patent Publication 2003-121791.
English Translation Abstract of Japanese Patent Publication 2004-170508.
English Translation Abstract of Japanese Patent Publication 06-244082.
English Translation Abstract of Japanese Patent Publication 10-124915.
English Translation Abstract of Japanese Patent Publication 2000-347138.

* cited by examiner

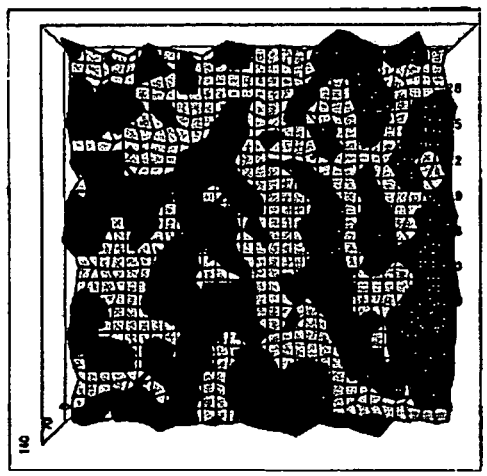
SPECKLE PATTERN OF 0 DEG.
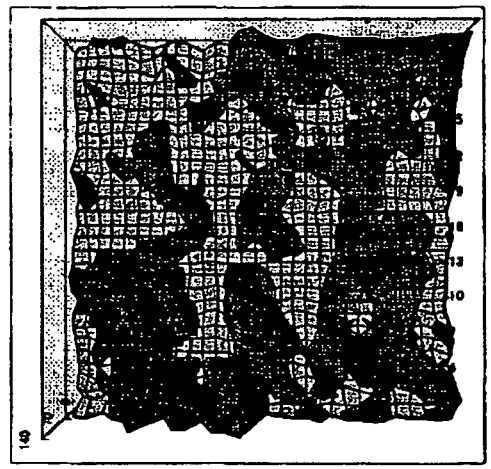
SPECKLE PATTERN OF 30 DEG.
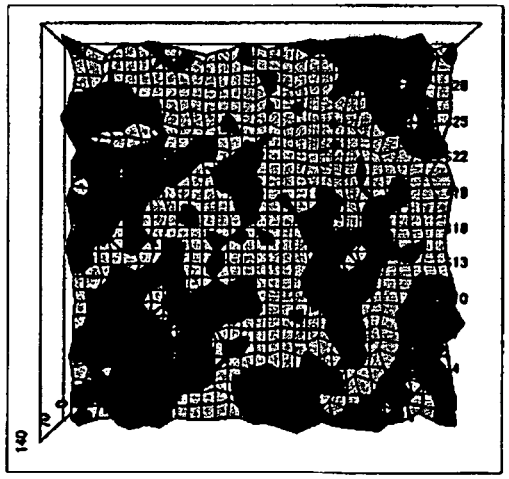
SPECKLE PATTERN OF 45 DEG.
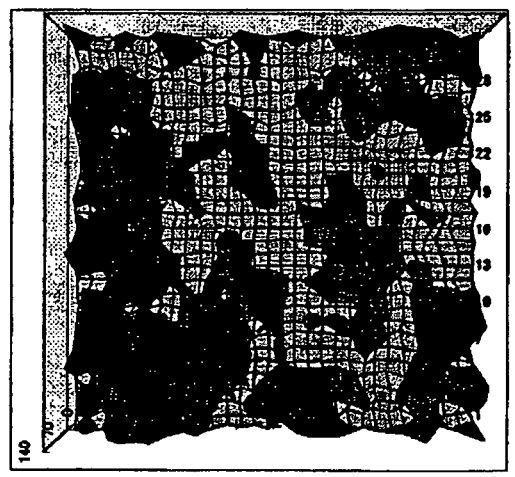
SPECKLE PATTERN OF 90 DEG.
FIG. 3
|  | CORRELATION COEFFICIENT |
|---|---|
| SPECKLE PATTERN OF 0 DEG. VS SPECKLE PATTERN OF 30 DEG. | 0.50 |
| SPECKLE PATTERN OF 0 DEG. VS SPECKLE PATTERN OF 45 DEG. | 0.28 |
| SPECKLE PATTERN OF 0 DEG. VS SPECKLE PATTERN OF 90 DEG. | 0.04 |
FIG. 4

DISPLAYING OPTICAL SYSTEM AND IMAGE PROJECTION APPARATUS

FIELD OF THE INVENTION

The present invention relates to a displaying optical system which projects images using coherent light (light with coherence) such as a laser beam.

BACKGROUND OF THE INVENTION

Many image projection apparatuses which project images using a laser beam have been proposed. For example, a laser scan display has been disclosed in Japanese Patent Laid-Open No. 2003-21800, which displays images on a screen by scanning the laser beam with a scanning device.

However, since the laser beam has high coherence, a speckle noise (that is, a granular interference pattern) which causes degradation of image quality appears in the displayed image.

A method for reducing a speckle noise has been disclosed in Japanese Patent Laid-Open No. 2000-206449, in which a transparent optical element having a refraction index n and including "N" areas whose thicknesses change by "$\Delta t$" is used. In the method, laser light that is a diverging luminous flux from a semiconductor laser (laser diode) is converted into a parallel luminous flux by a collimator lens, and enters the transparent optical element. The transparent optical element gives optical path differences "$(n-1)\Delta t$" to luminous fluxes (divided luminous flux) passing through portions with different thicknesses, thereby reducing the coherence of each divided luminous flux. It is possible to reduce the speckle noise by overlapping the incoherent luminous fluxes that have passed through the transparent optical element by a lens.

Furthermore, a method for reducing a speckle noise has been disclosed in Japanese Patent Laid-Open No. H06-208089, in which a laser beam is scattered with a rotatable diffusing element. The speckle pattern is changed at a speed undetectable to the human eye by rotating the diffusing element. Overlapping the speckle pattern changing at a high speed by the eye's afterimage effect makes it possible to reduce the speckle noise.

In addition, as an art for smoothing a speckle distribution to equalize the intensity distribution of a laser beam emitted and condensed in a laser-beam-condensing system, a method has been disclosed in Japanese Patent Laid-Open No. H10-39267, in which a polarized beam is divided into two luminous fluxes having mutually-orthogonal polarization directions by using a birefringent crystal or the like.

However, in the method disclosed in Japanese Patent Laid-Open No. 2000-206449, it is necessary to increase the step "$\Delta t$" of the transparent optical element to give enough optical path differences to the divided luminous fluxes. As a result, it becomes difficult to downsize the optical system. In particular, the size of the transparent optical element becomes larger when using light having a long coherence length such as a solid-state laser and a single-mode semiconductor laser.

Furthermore, in the method disclosed in Japanese Patent Laid-Open No. H06-208089, a loss of light amount becomes relatively large because the laser beam is transmitted through the diffusing element.

Furthermore, since the art disclosed in Japanese Patent Laid-Open No. H10-39267 is premised on a laser system used in nuclear fusion apparatuses, it is difficult to apply the art to displaying optical systems and image projection apparatuses.

BRIEF SUMMARY OF THE INVENTION

One object of the present invention is to provide a compact displaying optical system capable of reducing a speckle noise and a loss of light amount.

A displaying optical system that is one aspect of the present invention is a displaying optical system which projects images using coherent light. The displaying optical system comprises: a light source which emits the light; and a polarization control element which has a first area and a second area where light components of the light enter, respectively, and makes the polarization state of the light component entering the first area different from that of the light component entering the second area.

Other objects and further features of the present invention will become readily apparent from the following description of the preferred embodiments with reference to accompanying drawings.

BRIEF DESCRIPTION OF THE DRAWINGS

FIG. 3 is an explanatory diagram showing an appearance of a speckle pattern (an example of experiment) in Embodiment 1.

FIG. 4 is a table showing a correlation coefficient of a speckle pattern (an example of experiment) in Embodiment 1.

DETAILED DESCRIPTION OF THE PREFERRED EMBODIMENTS

Preferred embodiments of the present invention will hereinafter be described with reference to the drawings.

Embodiment 1

Figure 1:
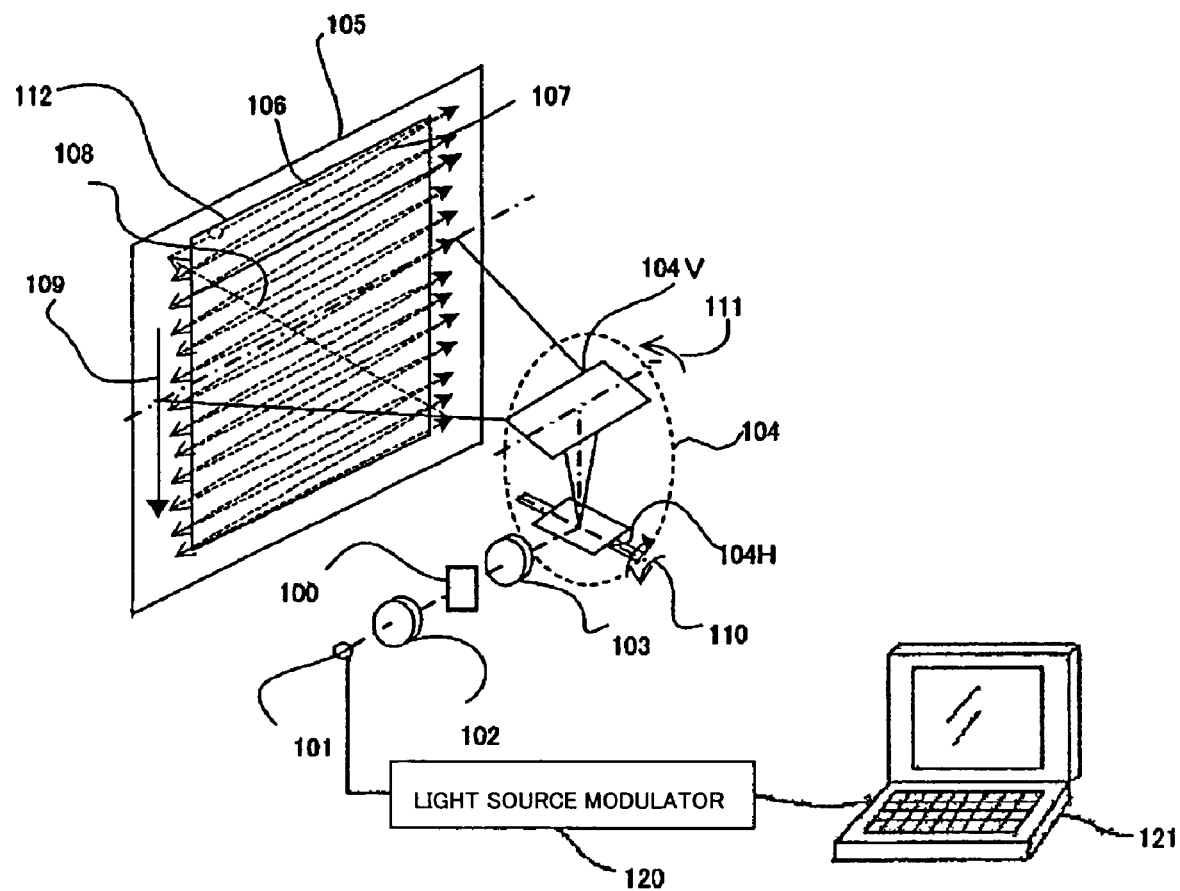
FIG. 1 is a schematic block diagram showing a displaying optical system used for an image projection apparatus that is Embodiment 1 of the present invention.

FIG. 1 shows a displaying optical system for an image projection apparatus that is Embodiment 1 of the present invention. In FIG. 1, reference numeral 101 denotes a laser source which is a light source emitting coherent light. The luminous flux emitted from the laser source 101 is converted into a substantially parallel luminous flux by a collimator lens 102.

A light-source modulator 120 is connected to the laser source 101. The light-source modulator 120 modulates the intensity of the laser light emitted from the laser source 101 according to image signals input from an image-signal supplying apparatus 120 such as a personal computer, DVD layer, video cassette recorder, or television tuner.

The substantially parallel luminous flux (hereinafter, it is referred to as a laser beam) emerged from the collimator lens 102 enters the condensing optical system 103 via a spatial polarization control element 100 which makes the polarization state of a component of the laser beam different from that of the other component, and then impinges on a scanning device 104. A detailed description of the spatial polarization control element 100 will be given later.

The polarization state means a pattern of polarized light such as a polarization direction of linearly-polarized light and a major-axis direction of elliptically-polarized light.

The condensing optical system 103 has a predetermined optical power that is a refractive power expressed by the reciprocal of a focal length, and makes the laser beam substantially form an image on the after-mentioned projection surface.

The scanning device 104 is constituted by a horizontal scanning mirror 104H and a vertical scanning mirror 104V, and scans the incident laser beam in a two-dimensional direction. In this embodiment, a MEMS (Micro Electro Mechanical System) mirror device which is manufactured using semiconductor manufacturing techniques is used as the horizontal scanning mirror 104H; the device can perform a reciprocate motion (resonant oscillation) of a mirror by using electromagnetic force or the like. The mirror surface of the horizontal scanning mirror 104H has a very small size of 1.5 mm square.

In contrast, a galvanometer mirror is used as the vertical scanning mirror 104V in this embodiment.

In addition, the present embodiment uses the horizontal scanning mirror 104H and the vertical scanning mirror 104V, each deflecting (scanning) the laser beam in a one-dimensional direction. However, a MEMS mirror device which oscillates a mirror in a two-dimensional direction may be used.

The laser beam scanned by the scanning device 104 directs to a scan surface (projection surface) 105 such as a screen and a wall surface. The laser beam emitted from the laser source 101 and substantially condensed by the collimator lens 102 and the condensing optical system 103 forms an image. Therefore, the image of the light source is scanned by the scanning device 104 in the two-dimensional direction.

In FIG. 1, an arrow 110 indicates the rotational direction of the horizontal scanning mirror 104H, and an arrow 111 indicates the rotational direction of the vertical scanning mirror 104V. The rotation of the vertical scanning mirror 104V in the direction indicated by the arrow 111 scans a spot (image of the light source) of the laser beam in the direction indicated by an arrow 109 on the scan surface 105. Therefore, on the scan surface 105, scanning lines 106 and 107 reciprocating in the horizontal direction are formed from the upper end towards the lower end of the scan surface 105. Thereby, one frame image is displayed by an afterimage effect of human's eyes.

The vertical scanning mirror 104V forms the scanning line 106 on the lower end of the scan surface 105, and then forms the scanning line 106 on the upper end thereof to form the next frame image. This operation is subsequently repeated. For example, in a case where scanning of 60 Hz in the vertical direction is repeated to form SVGA images of 800 pixels in the horizontal direction and 600 pixels in the vertical direction, since 10% of 60 Hz is the flyback time, the remaining 90% thereof is the drawing time, and 300 horizontal scanning lines are required for each of the outward and homeward routes, a resonant frequency of 20 kHz (60 Hz/0.9×300) is required for the horizontal scanning mirror 104H.

In FIG. 1, a smaller number of scanning lines than the actual number thereof are indicated. An area 112 on the scan surface 105 is an area where images are actually displayed. Since the horizontal scanning mirror 104H oscillates in a sinusoidal manner, the speed thereof becomes low at the vicinity of the maximum amplitude position, which state unfits to display images. Therefore, the images are displayed only in the area 112 on the inner side of the area corresponding to the maximum amplitude position of the horizontal scanning mirror 104H.

In this embodiment, the spatial polarization control element 100 is disposed between the laser source 101 and the scan surface (screen) 105, especially between the laser source 101 and the scanning device 104. More concretely, the spatial polarization control element 100 is disposed between the collimator lens 102 and the condensing optical system 103.

Figure 2A:
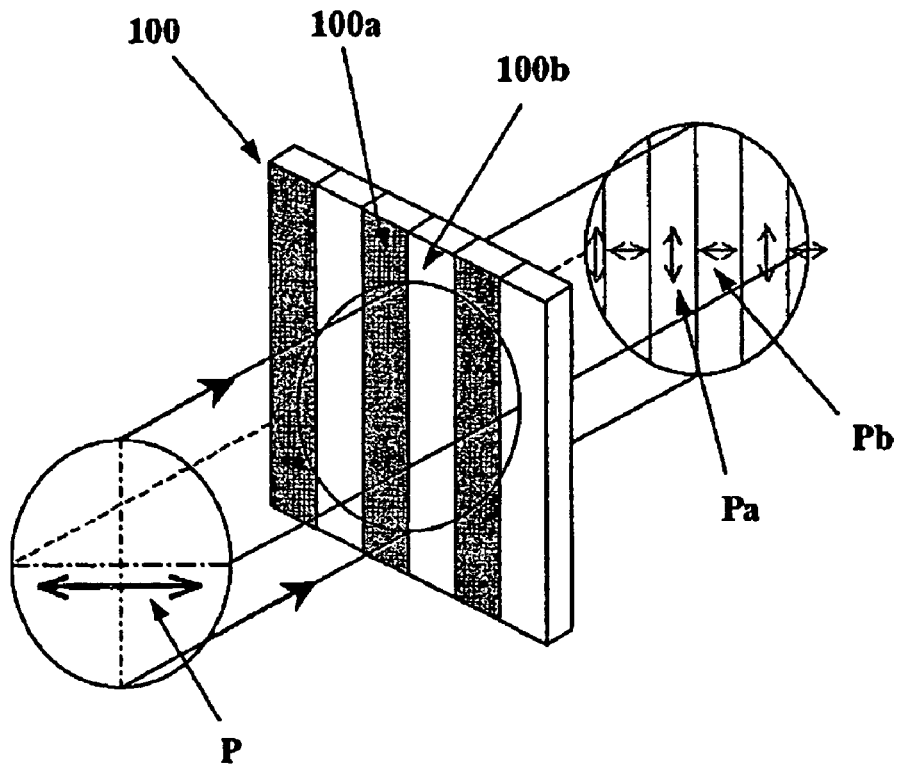
FIG. 2A is an explanatory diagram showing the structure of a spatial polarization control element in Embodiment 1.

The description of the spatial polarization control element 100 will hereinafter be given with reference to FIG. 2A. FIG. 2A schematically shows the structure of the spatial polarization control element 100. Further, FIG. 2A schematically shows the laser beam that has been converted into a substantially parallel luminous flux by the collimator lens 102 shown in FIG. 1 and passes through the spatial polarization control element 100.

In this embodiment, a solid-state laser is used as the laser source 101, and the solid-state laser source 101 emits a linearly-polarized laser luminous flux. Therefore, FIG. 2A shows the direction (horizontal direction) of the laser beam entering the spatial polarization control element 100 by an arrow, and hereinafter the laser beam is referred to as a linearly-polarized laser beam P.

The spatial polarization control element 100 is divided into a plurality of areas in the direction of the laser beam's diameter, and is configured so as to give different phase differences to beam components passing through adjacent areas (hereinafter, they are referred to as area components) of one laser beam. In this embodiment, the spatial polarization control element 100 has a vertical striped configuration in which first areas 100a and second areas 100b are alternately disposed. In the first area 100a, a phase plate as an optical member that gives a phase difference to the area component is provided. In the second area 100b, a simple transmitting member that gives no phase difference to the area component is provided. In other words, a phase plate is not provided in the second area 100b.

The phase plate provided in the first area 100a is a ½-wave plate. Therefore, the horizontal polarization direction of the area component that entered the first area 100a, which is a part of the linearly-polarized laser beam P, is rotated by 90 degrees by transmission of the area component through the first area 100a, and the area component is emerged from the spatial polarization control element 100 as linearly-polarized light Pa having a vertical polarization direction.

On the other hand, the horizontal polarization direction of the area component that entered the second area 100b, which is another part of the linearly-polarized laser beam P, is not rotated, and the area component as linearly-polarized light Pb having the horizontal polarization direction is emerged from the spatial polarization control element 100 without change.

As described above, the spatial polarization control element 100 divides the laser beam into a plurality of area components, and makes both of the vertical linearly-polarized light component Pa and horizontal linearly-polarized light component Pb exist in the laser beam bypassing area. Hereinafter, the laser beam including the linearly-polarized light components having different polarization direction is referred to as a polarization-combined beam, and this function of the spatial polarization control element 100 is referred to as a polarization-combining function.

The polarization-combined beam is scanned by the scanning device 104, and led to the screen 105 to form a projected image.

The description will hereinafter be given of the principle of speckle noise reduction by the function of the spatial polarization control element 100 in this embodiment.

The speckle noise is expressed by overlapping of scattering light components of the laser beam reflected on a screen, which is disposed on the scan surface 105, with a random phase relationship on an observer's retina.

The average value of surface asperity (root mean square roughness) of normal screens is greater than the wavelength of the laser light, and its average interval (correlation length of the surface roughness) is much smaller than the diameter of the irradiation spot. Therefore, many spherical waves whose phases uniformly distribute between 0 and 2π are mixed in the scattering light from the screen. The components of the scattering light overlap with each other on the observer's retina, thereby generating an irregularly granular interference pattern. This pattern is the speckle pattern.

There is a method for reducing the speckle noise, in which the speckle intensity is smoothed by overlapping a plurality of speckle patterns having a low correlation with each other. Overlapping N speckle patterns having a low correlation with each other (in other words, independent speckle patterns) reduces the speckle contrast C expressing a quantification value of the speckle intensity by a fraction of $\sqrt{N}$. The speckle contrast C is defined as a ratio of a standard deviation "σI" of the speckle intensity "I" to an average value thereof "<I>", as described below.

$C=\sigma I/<I>$

To reduce the speckle noise using this method, it is necessary to produce a plurality of speckle patterns having a low correlation with each other.

The present embodiment also uses the method for reducing the speckle noise by generating a plurality of speckle patterns having a low correlation with each other, and overlapping the speckle intensities (speckle patterns).

Here, the description will be given of the relationship between polarization directions of laser beams impinging on a screen and speckle patterns on the basis of experimental results. FIG. 3 shows contour plans expressing the speckle intensities in cases where the polarization direction of the laser beam with respect to the horizontal direction of the screen are 0, 30, 45 and 90 degrees. The horizontal and vertical directions in FIG. 3 correspond to those of the screen, and a black portion in FIG. 3 represents a portion where the speckle intensity on the screen is high.

As shown in FIG. 3, the speckle patterns in the displayed image were different from each other depending on the polarization direction of the laser beam impinging on the screen. Further, regarding to the correlation between the speckle pattern generated by the linearly-polarized light having the plane of vibration in the horizontal direction of the screen and the speckle pattern generated by the linearly-polarized light that forms an angle "θ" with the horizontal direction, the correlation of the speckle patterns became lower as θ became larger. The speckle patterns became independent patterns having no correlation with each other in the case where their polarization directions were mutually orthogonal (θ=90 degrees).

FIG. 4 shows the calculation result of the correlation coefficient of speckle patterns, specifically correlation coefficients between the speckle patterns generated by two linearly-polarized light components whose difference of the polarization directions is 30, 45, and 90 degrees.

The correlation coefficient "r" between the speckle intensities "X1" and "X2" of the respective patterns is defined by using the average values of the speckle intensity "<X1>" and "<X2>", as described below.

$$r = \frac{\sum (X_1 - <X_1>)(X_2 - <X_2>)}{\sqrt{\sum (X_1 - <X_1>)^2} \sqrt{\sum (X_2 - <X_2>)^2}}$$

In this embodiment, the polarization-combining function is given to the spatial polarization control element 100 by providing the phase plate (½-wave plate) in the first area 100a and providing the transmitting member in the second area 100b. Thereby, a plurality of speckle patterns having a low correlation with each other are generated, and the speckle intensities are overlapped.

In particular, as shown in FIG. 2A, the polarization-combined beam is produced, in which an area component that has passed through the second area 100b has the plane of vibration in the horizontal direction and the other area component that has passed through the first area 100a has the plane of vibration in the vertical direction, by making the laser beam of the linearly-polarized light P having the plane of vibration in the horizontal direction enter the spatial polarization control element 100. The polarization-combined beam is led to the screen on the scan surface 105 to display a projected image.

At this time, the surface roughness of the screen makes the laser beam led to the screen scatter, and the scattering light generates speckle patterns. However, the speckle patterns are different from each other according to the polarization directions of the area components of the laser beam led to the screen, and a plurality of speckle patterns having little correlation are generated if the polarization directions are substantially orthogonal to each other.

Then, in this embodiment, the visible speckle noise is reduced by overlapping the speckle pattern generated by the horizontal linearly-polarized light Pb and the speckle pattern generated by the vertical linearly-polarized light Pa.

According to the experiment, the speckle contrast could be reduced to 74% (from C=0.31 to C=0.23). This means that the speckle contrast C is reduced approximately to a fraction of $\sqrt{2}$ in the case where the number of the overlapped pattern N is 2.

As described above, it is possible to reduce the speckle contrast C in a simple configuration by using the spatial polarization control element 100. Therefore, it is possible to improve the quality of images projected by the displaying optical system (that is, by the image projection apparatus), and to reduce the size and cost of the optical system.

Although the spatial polarization control element 100 is disposed between the laser source 101 and the scanning device 104 in this embodiment, the present invention is not limited thereto, the spatial polarization control element may be disposed at any position between the laser source 101 and the projection surface (screen) 105 in the present invention.

However, disposing the spatial polarization control element 100 at the position described in the above-mentioned embodiment can reduce the size of the spatial polarization control element 100, that is, the displaying optical system. This is because, at that position, the laser beam is not yet deflected (scanned) by the scanning device 104, and the diameter of the laser beam is small. Furthermore, there are some merits as described below.

The present embodiment's spatial polarization control element 100 is an element in which the phase plates and transmitting members are alternately (periodically) arranged in a striped manner, and diffracted light is generated in the stripe arrangement direction. The irradiated position of a higher-order diffracted light component than the ±1st and ±2nd-order diffracted light components on the screen is different from that of the 0th-order diffracted light component, thereby deteriorating the resolution of the projected image.

As described above, a MEMS mirror device is used as the horizontal scanning mirror 104H in this embodiment; the reflective surface thereof is as small as 1.5×1.5 mm. Therefore, in this embodiment, the spatial polarization control element 100 is disposed between the laser source 101 and the scanning device 104. This makes it possible to cut the high-order diffracted light by the MEMS mirror so that the high-order diffracted light may not reach the screen.

In addition, since the MEMS mirror device that is the horizontal scanning mirror 104H has beam portions which are rotational axes (rod-like portions linking the reflective surface with an outer frame of the device), there is a possibility that light reflected on the beam portions reach the screen.

Figure 2B:
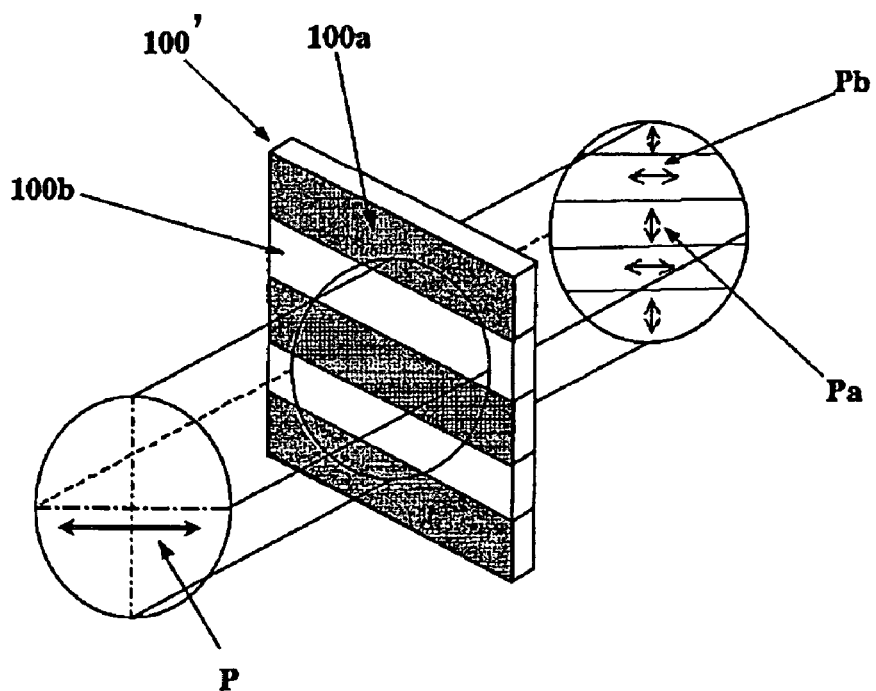
FIG. 2B is an explanatory diagram showing the structure of another spatial polarization control element in Embodiment 1.

To solve the problem, it is preferable to use a spatial polarization control element 100' shown in FIG. 2B that is a modified example of the present embodiment. The spatial polarization control element 100' is an element in which its stripe arrangement direction is a direction substantially orthogonal to the longitudinal direction of the beam portion of the MEMS mirror device (see FIG. 1). Thereby, since diffraction light is generated in a direction different from the beam portion of the MEMS mirror device, that is, a direction substantially orthogonal to the rotational axis of the MEMS mirror device, it becomes possible to prevent high-order diffracted light from impinging on the reflective surface and beam portion of the MEMS mirror device.

Consequently, it is possible to prevent the high-order diffracted light from becoming ghost light that causes deterioration of the image quality.

In addition, although the displaying optical system of this embodiment uses a solid-state laser as the laser source, and displays images by direct modulation of the laser source, the present invention is not limited thereto. For example, a continuously-emitted laser beam from a solid-state laser may be modulated by a spatial light modulator such as a Digital Micro-mirror Device (DMD), and display images.

Embodiment 2

Figure 5:
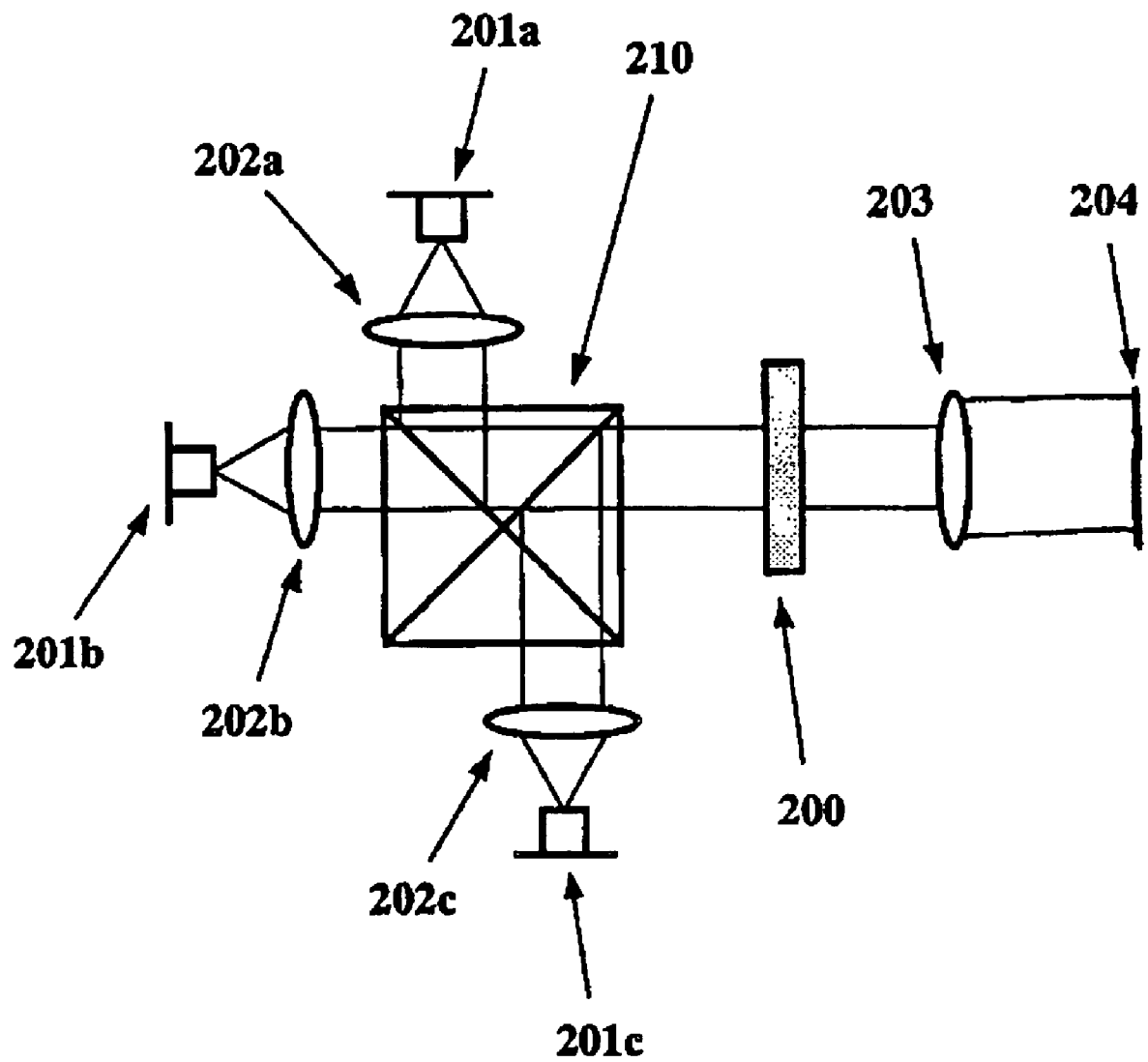
FIG. 5 is a schematic block diagram showing a displaying optical system used for an image projection apparatus that is Embodiment 2 of the present invention.

FIG. 5 is a horizontal sectional view showing a displaying optical system for an image projection apparatus that is Embodiment 2 of the present invention. In this embodiment, laser sources emitting red light, green light, and blue light, respectively, are used.

The divergent luminous fluxes emitted from the red laser source 201a, green laser source 201b, and blue laser source 201c are converted into substantially parallel luminous fluxes by collimator lenses 202a, 202b and 202c, respectively, and then combined by a cross-dichroic prism 210. The luminous flux (color-combined laser beam) emerged from the cross-dichroic prism 210 enters a spatial polarization control element 200.

The color-combined laser beam emerged from the spatial polarization control element 200 enters an illumination optical system 203. The illumination optical system 203 enlarges the diameter of the entering laser beam, and converts the laser beam into a substantially parallel luminous flux to irradiate a spatial light modulator 204 with the laser beam.

The spatial light modulator 204 is a two-dimensional light modulator constituted by a Digital Micro-mirror Device (DMD), modulating incident light according to image signals from the image-signal supplying apparatus shown in FIG. 1. The laser beam emerged from the spatial light modulator 204 is projected on a projection surface such as a screen by a projection optical system, not shown in the figure.

In this embodiment, the polarization-combined beam is produced, in which an area component has the plane of vibration in the horizontal direction and the other area component has the plane of vibration in the vertical direction, by the spatial polarization control element 200. The polarization-combined beam is led to the screen via the spatial light modulator 204 to display a color projected image.

In addition, although the two-dimensional light modulator is used in this embodiment, a one-dimensional light modulator which modulates the laser beam in a first one-dimensional direction may be used. In this case, it is possible to display two-dimensional images by scanning the laser beam that has been modulated in a second one-dimensional direction, in the first one-dimensional direction by the one-dimensional light modulator.

Figure 6A:
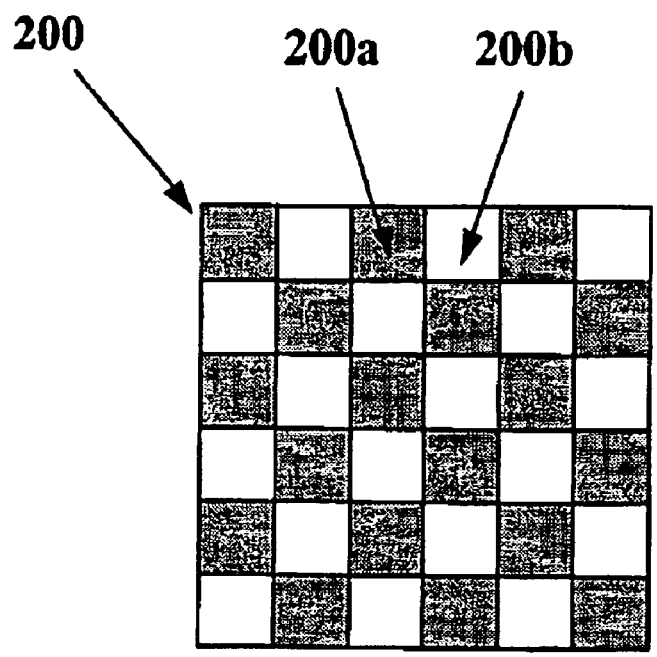
FIG. 6A is an explanatory diagram showing the structure of a spatial polarization control element in Embodiment 2.
Figure 6B:
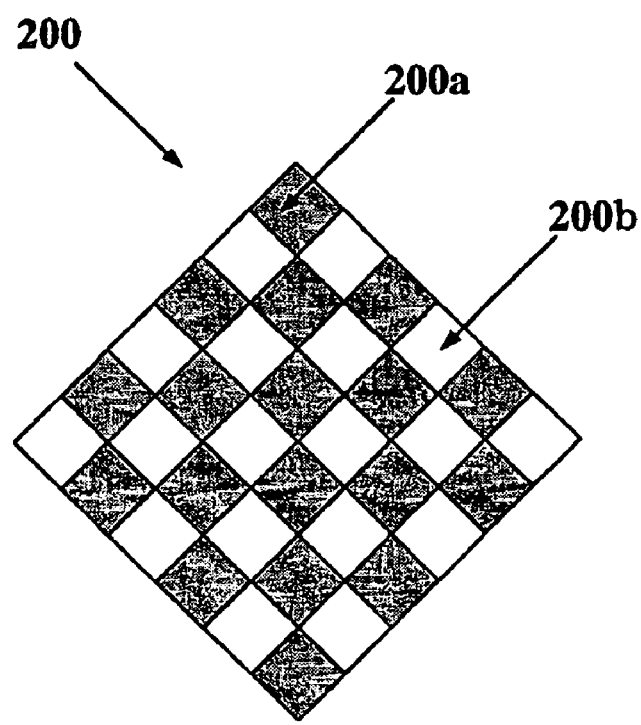
FIG. 6B is an explanatory diagram showing the structure of another spatial polarization control element in Embodiment 2.

FIG. 6A shows a structure of the spatial polarization control element 200 in this embodiment. The spatial polarization control element 200 is constituted by arranging first areas 200a and second areas 200b in a two-dimensional lattice-like pattern, in other words, in a checked pattern. A ½-wave plate that is a phase plate is provided in the first area 200a, and a simple transmitting member is provided in the second area 200b.

When a linearly-polarized light (color-combined beam) having a horizontal polarization direction (the horizontal direction in the figure) enters the spatial polarization control element 200, an area component passing through the first area 200a of the linearly-polarized light emerges from the phase plate with its polarization direction rotated. In contrast, an area component passing through the second area 200b of the linearly-polarized light having the horizontal polarization direction emerges from the phase plate without change. Therefore, it is possible to convert the color-combined beam that is a horizontal linearly-polarized light into a polarization-combined beam in which a horizontal polarized light component and a non-horizontal polarized light component exist by passing area.

Then, when the polarization-combined beam reaches the screen, light scattered on the screen generates speckle patterns according to the polarization directions of the polarized light components. Overlapping these speckle patterns can reduce the speckle contrast.

As described in Embodiment 1, the speckle patterns generated by the polarization-combined beam including two polarized light components having different polarization directions has little correlation when the two polarization directions are orthogonal to each other. In other words, each speckle pattern becomes an independent pattern. Therefore, it is best to rotate the polarization direction of the area component passing through the first area 200a by 90 degrees to convert it into a vertical polarized light component. However, this embodiment has three emission wavelengths (colors) of the laser sources, and it is difficult to rotate the polarization directions of the three color laser beams by 90 degrees simultaneously.

On the other hand, a color that shows observers the speckle noise most prominently among red, green and blue, which are used for displaying color images, is green which has high luminosity factor.

Therefore, this embodiment uses a ½-wave plate whose set wavelength (designed central wavelength) is in the green region as the phase plate provided in the first area 200a. Specifically, the green wavelength λg is 530 nm, and this embodiment uses a ½-wave plate which is set so as to rotate the polarization direction of the green laser beam by 90 degrees. Thereby, it is possible to reduce the speckle noise generated by the green laser beam quite efficiently. Furthermore, since the green wavelength λg (530 nm) is a substantially intermediate wavelength between the red wavelength λr (640 nm) and the blue wavelength λb (440 nm), the ½-wave plate can rotate the polarization direction of the three color laser beams efficiently.

In other words, it is preferable to satisfy the following condition:

$$\lambda b < \lambda w < \lambda r$$

where λw represents a set wavelength of the ½-wave plate, λb represents the wavelength of the blue light, and λr represents the wavelength of the red light.

In short, a wavelength is selected as the set wavelength of the ½-wave plate so that the ½-wave plate can give a phase difference of π to the green laser beam.

Thereby, it is possible to reduce the speckle noise of the color image projected on the screen efficiently, and to display the color image so that the visible speckle noise for the observer may be minimized.

Although the ½-wave plates as the phase plates and the transmitting members are arranged in a two-dimensional lattice-like pattern (checked pattern), two spatial polarization control elements each including ½-wave plates and transmitting members arranged in a striped pattern as shown in Embodiment 1 may be used. In this case, the two spatial polarization control elements are arranged so that the stripe arrangement directions may be orthogonal to each other, and overlapped. Thereby, the two spatial polarization control elements can have the equivalent function to that of the spatial polarization control element 200 of the present embodiment.

When the laser beam passes through the two spatial polarization control elements, the area component having the horizontal polarization direction and passing through an area in which the transmitting members are overlapped is transmitted through them without any rotation of the polarization direction. On the other hand, the area component passing through the first area of one spatial polarization control element and the second area of the other spatial polarization control element is converted into vertical linearly-polarized light by a 90-degree rotation of the polarization direction. Furthermore, the area component passing through the first areas of both the two spatial polarization control elements is converted into horizontal linearly-polarized light by a 180-degree rotation of the polarization direction. Thereby, the polarization-combined beam is generated, in which the horizontal polarized light components and vertical polarized light components are arranged in a two-dimensional lattice-like pattern in one laser beam.

According to this method, it is possible to produce the spatial polarization control element for generating the polarization-combined beam in which the horizontal polarized light components and vertical polarized light components are arranged in a two-dimensional lattice-like pattern easily.

Although the spatial polarization control element 200 is disposed between the laser sources 201a, 201b and 201c and the spatial light modulator 204, the spatial polarization control element 200 can be disposed at any position between the laser sources and the projection surface. However, it is possible to miniaturize the spatial polarization control element 200 by disposing it on the side closer to the projection surface than the spatial light modulator 204, especially between the laser sources 201a, 201b and 201c and the spatial light modulator 204 or the illumination optical system 203. This is because the diameter of the laser beam is smaller in the area between the laser sources and the illumination optical system 203 than in the area on the side closer to the projection surface than the illumination optical system 203. Furthermore, the spatial polarization control element may be disposed in each color's optical path before the red, green and blue laser beams are combined.

In addition, to prevent the diffracted light from the spatial polarization control element 200 from reflecting on the beam portion of the MEMS mirror device that is the horizontal scanning mirror 104H, it is preferable to dispose the spatial polarization control element 200 so that, as shown in FIG. 6A, the arrangement direction of the first and second areas 200a and 200b (lattice arrangement direction) forms an angle of 45 degrees with the longitudinal direction of the beam portion (rotational axis direction of the MEMS mirror device, that is, the horizontal direction in the figure). By making the lattice arrangement direction different from the longitudinal direction of the beam portion of the MEMS mirror device like this, it is possible to prevent the diffracted light from impinging on the reflective surface and beam portion of the MEMS mirror device. Therefore, it is possible to eliminate ghost light generated by the high-order diffracted light mostly, thereby increasing the quality of displayed images.

Figure 7:
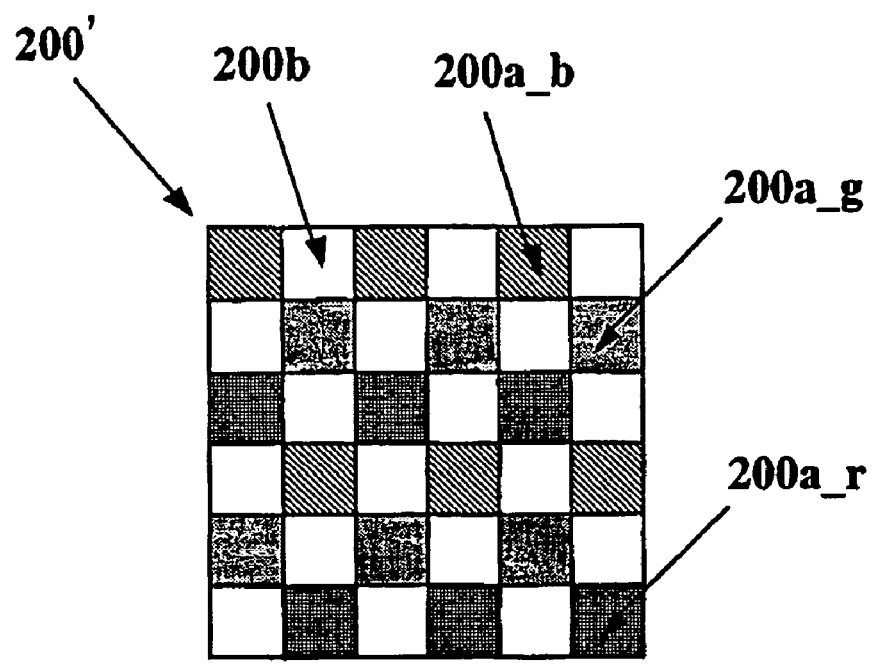
FIG. 7 is an explanatory diagram showing the structure of still another spatial polarization control element in Embodiment 2.

Furthermore, though this embodiment uses one kind of phase plate as the spatial polarization control element 200, the present invention is not limited thereto. For example, a spatial polarization control element 200' shown in FIG. 7 may be used. In the spatial polarization control element 200', phase plates having different set wavelengths are provided in the first areas 200a. Specifically, ½-wave plates 200a_r whose set wavelength is in the red wavelength region, ½-wave plates 200a_g whose set wavelength is in the green wavelength region, and ½-wave plates 200a_b whose set wavelength is in the blue wavelength region are arranged in a mosaic-like pattern.

Furthermore, a SHG (Second Harmonic Generation) laser source which generates the green laser by wavelength-conversion of an infrared laser to a green laser may be used as the green laser source 201b.

Embodiment 3

Figure 8:
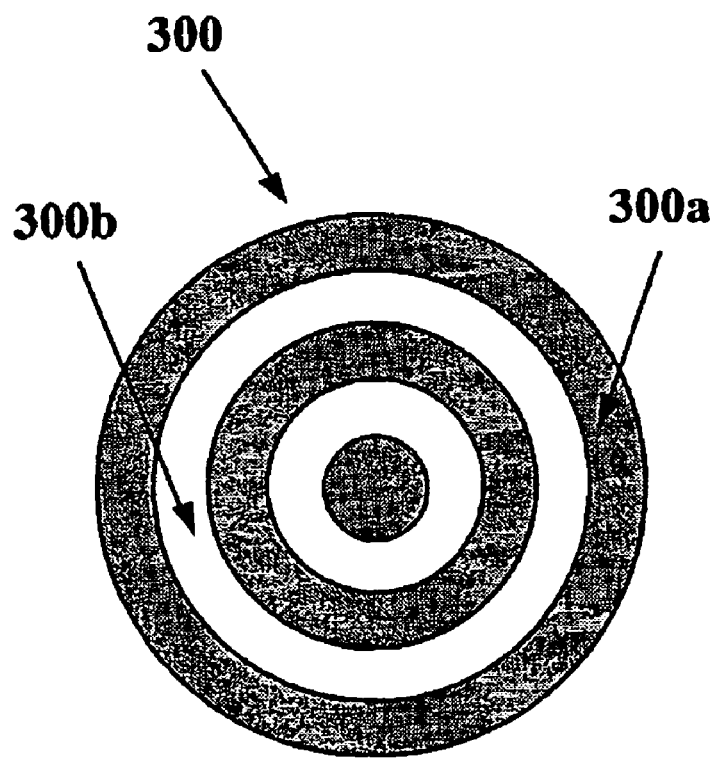
FIG. 8 is an explanatory diagram showing the structure of a spatial polarization control element used for an image projection apparatus that is Embodiment 3 of the present invention.

FIG. 8 shows a spatial polarization control element used for a displaying optical system in an image projection apparatus that is Embodiment 3 of the present invention. The displaying optical system of this embodiment is similar to that described in Embodiment 1 or Embodiment 2.

In this embodiment, the spatial polarization control element 300 is divided into a plurality of concentric areas, and polarizing elements 300a and simple transmitting members 300b are alternately arranged in the radial direction.

A SWS (Sub-Wavelength Structure) is used in the polarizing element 300a. The SWS has a periodic structure having a pitch smaller than the wavelength of entering light, the structure which is formed on the surface of an element such as a transparent substrate, and functions as a wave plate. Using the SWS functioning as a wave plate makes it possible to produce a polarizing element having a freely designed shape such as a shape having concentric areas. Further, since the wave plate using the SWS has small wavelength dependence, the rotation angle of the polarization direction of each color laser beam in a wide wavelength region can be set to an angle of approximately 90 degrees, thereby making it possible to obtain a great effect of reducing the speckle noise. In addition, the wave plate using the SWS can be produced easily and at low cost by injection molding.

In this embodiment, horizontal linearly-polarized light and vertical linearly-polarized light exist in the laser beam that has passed through the spatial polarization control element 300 by passing area. Therefore, it is possible to reduce the speckle contrast (speckle noise) of images projected on the screen as Embodiments 1 and 2.

Here, it is known that the speckle pattern changes depending on the incident angle of the light projected on the screen.

When a laser beam enters a spatial polarization control element in which optical members such as phase plates, and transmitting members are periodically arranged, diffracted light is generated. Since the incident angles of the ±1st, ± 2nd, . . . , ±30th, and higher-order diffracted light components on the screen are different from that of the 0th-order diffracted light component, speckle patterns according to the incident angle are generated. It is possible to reduce the speckle contrast by overlapping those speckle patterns. However, the irradiated positions of the diffracted light components in the screen are different from each other, thereby deteriorating the resolution of the projected image.

Regarding to this problem, since the phase plates and transmitting members are concentrically arranged in the spatial polarization control element 300 of this embodiment, the diffracted light of the entering light is generated around the optical axis. Therefore, when the 0th-order diffracted light component is focused onto the screen, the ±1st, ±2nd, . . . , ±30th, and higher-order diffracted light components impinge on the same position on the screen as the 0th-order diffracted light component. At this time, since the angle of rays included in each diffracted light component is different by diffracted light component, speckle patterns corresponding to the orders of the respective diffracted light components are generated. Therefore, it is possible to reduce the speckle contrast by overlapping these speckle patterns.

In scanning image projection apparatuses like this embodiment, the spot depth is generally very large. Therefore, when the 0th-order diffracted light component is focused on the screen, the collecting point of a relatively low-order diffracted light component such as the ±1st or ±2nd-order diffracted light component falls in the spot depth even if the collecting point shifts from the screen, thereby preventing deterioration of the projected image's resolution.

As described above, by using the spatial polarization control element of this embodiment, it is possible to obtain not only the effect of reducing the speckle contrast by the polarization of light, but also the effect of reducing the speckle contrast by the difference of the incident angles. Further, it is also possible to obtain the effect of suppressing deterioration of the projected image's resolution. Therefore, it is possible to achieve an image projection apparatus capable of displaying high quality images in which the speckle contrast is suppressed to a low level.

Figure 9:
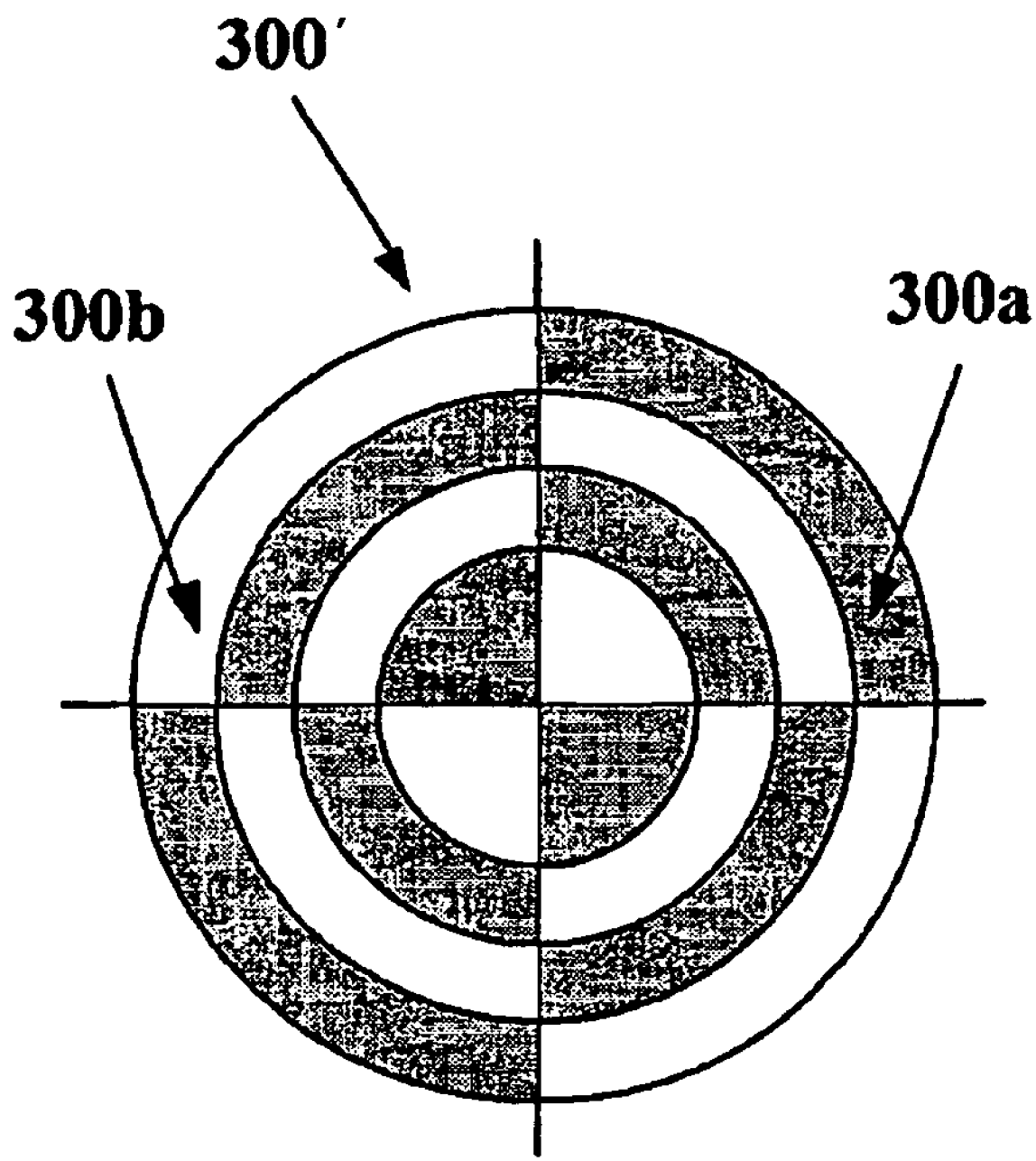
FIG. 9 is an explanatory diagram showing the structure of another spatial polarization control element in Embodiment 3.

Although the spatial polarization control element 300 in which the phase plates and transmitting members are concentrically and alternately arranged is used in this embodiment as shown in FIG. 8, the present invention is not limited thereto. For example, a spatial polarization control element 300' shown in FIG. 9 may be used, in which the optical members such as the phase plates, and the transmitting members are alternately arranged in areas demarcated by concentric lines and cross lines.

Further, although the spatial polarization control element in which the optical members such as the phase plates, and the transmitting members were arranged in a plurality of areas was used in each of the above-mentioned embodiments, the present invention is not limited thereto. For example, first phase plates and second phase plates each of which gives a phase difference that is different from the first phase plate to the laser beam may be arranged in the plurality of areas.

Furthermore, although the laser light was used as coherent light in each of the above-mentioned embodiments, other coherent light may be used in the present invention.

Furthermore, although ½-wave plates were provided in the spatial polarization control element in each of the above-mentioned embodiments, other phase plates can be used. For example, a wave plate may be used, which converts entering linearly-polarized light into elliptically-polarized light of the major-axis direction that is different from the polarization direction of the linearly-polarized light being transmitted through the transmitting member without change.

In short, any spatial polarization control element can be used regardless of structure if it is an element that generates a plurality of light components (area components) having different polarization states for generating different speckle patterns. Also, an element having no phase plate, such as a birefringent element which has a plurality of areas giving different phase differences to light, can be used.

As described above, according to each of the above-mentioned embodiments, the spatial polarization control element converts the laser light into luminous fluxes having at least two polarization directions, and leads the luminous fluxes to the projection surface. Therefore, it is possible to two kinds of speckle patterns simultaneously. Since these speckle patterns are overlapped and observed by human's eyes, the striping of the speckle patterns are equalized, thereby making it possible to reduce the speckle noise of the projected images, and improve the image quality.

In other words, according to the displaying optical system described in each of the above-mentioned embodiments, it is possible to reduce the speckle noise and improve the image quality while it is a compact optical system with a small loss of light amount.

This application claims a foreign priority benefit based on Japanese Patent Applications No. 2004-224781, filed on Jul. 30, 2004, which is hereby incorporated by reference herein in its entirety as if fully set forth herein.

What is claimed is:

1. A displaying optical system which projects images using coherent light, comprising:
    a light source which emits the light; and
    a polarization control element which has a first area and a second area where light components of the light enter, respectively, and makes the polarization state of the light component exiting the first area different from that of the light component exiting the second area,
    wherein the polarization control element includes an optical member which gives a phase difference to the light component in the first area and gives no phase difference to the light component in the second area, and
    wherein the optical member has a minute grating structure having a period smaller than a wavelength of the light.

2. The displaying optical system according to claim 1, further comprising a scanning device which scans the light emitted from the light source,
   wherein the polarization control element is disposed between the light source and the scanning device.

3. The displaying optical system according to claim 1, further comprising a modulator which modulates the light emitted from the light source in accordance with an image signal,
   wherein the polarization control element is disposed between the light source and the modulator.

4. The displaying optical system according to claim 1, wherein the optical member is a phase plate.

5. The displaying optical system according to claim 1, wherein the first and second areas are arranged alternately in the polarization control element.

6. The displaying optical system according to claim 1, wherein the first and second areas are arranged alternately in a checked pattern in the polarization control element.

7. The displaying optical system according to claim 1, wherein the first and second areas are arranged in a concentric pattern in the polarization control element.

8. The displaying optical system according to claim 1, wherein the light source emits red light, green light and blue light, and
   the following condition is satisfied:

$$\lambda b < \lambda w < \lambda r$$

where $\lambda w$ represents a set wavelength of the optical member, $\lambda b$ represents the wavelength of the blue light, and $\lambda r$ represents the wavelength of the red light.

9. The displaying optical system according to claim 1, wherein the light source emits red light, green light and blue light, and
   the polarization control element has a plurality of areas, as the first area, in which the optical member is provided, respectively, the optical members having set wavelengths in the wavelength regions of the red light, green light and blue light, respectively.

10. An image projection apparatus comprising:
    the displaying optical system according to claim 1; and
    a light-source modulator which modulates the intensity of the light that is emitted from the light source.

11. An image displaying system comprising:
    the image projection apparatus according to claim 10; and
    an image-signal supplying apparatus which supplies an image signal to the image projection apparatus.

12. A displaying optical system which projects images using coherent light, comprising:
    a light source which emits the light; and
    a polarization control element which has a first area and a second area where light components of the light enter, respectively, and makes the polarization state of the light component exiting the first area different from that of the light component exiting the second area,
    wherein the polarization control element includes a first optical member which gives a first phase difference to the light component in the first area, and a second optical member which gives a second phase difference that is different from the first phase difference to the light component in the second area, and
    wherein the first and second optical members have a minute grating structure having a period smaller than a wavelength of the light.

13. The displaying optical system according to claim 12, wherein the first and the second optical members are phase difference plates.

14. The displaying optical system according to claim 12, wherein the light source emits red light, green light and blue light, and
    the following condition is satisfied:

$$\lambda b < \lambda w < \lambda r$$

where $\lambda w$ represents a set wavelength of the optical member, $\lambda b$ represents the wavelength of the blue light, and $\lambda r$ represents the wavelength of the red light.

15. The displaying optical system according to claim 12, wherein the light source emits red light, green light and blue light, and
    the polarization control element has a plurality of areas, as the first area, in which the first optical member is provided, respectively, the optical members having set wavelengths in the wavelength regions of the red light, green light and blue light, respectively.

16. An image displaying system comprising:
    the displaying optical system according to claim 12; and
    a light-source modulator which modulates the intensity of the light that is emitted from the light source.

17. An image displaying system comprising:
    the image projection apparatus according to claim 16; and
    an image-signal supplying apparatus which supplies an image signal to the image projection apparatus.

* * * * *